United States Patent

Satran et al.

[11] Patent Number: 5,580,194
[45] Date of Patent: Dec. 3, 1996

[54] CUTTING TOOL

[75] Inventors: Amir Satran, Kfar Havradim; Yuri Men, Haifa, both of Israel

[73] Assignee: Iscar, Ltd., Migdal Tefen, Israel

[21] Appl. No.: 304,986

[22] Filed: Sep. 13, 1994

[30] Foreign Application Priority Data

Sep. 13, 1993 [IL] Israel ........................................ 106999

[51] Int. Cl.$^6$ ........................................ B23C 5/22
[52] U.S. Cl. ........................... 407/40; 407/47; 407/114
[58] Field of Search ............................ 407/33, 34, 35, 407/36, 37, 38, 39, 40, 47, 48, 50, 114

[56] References Cited

U.S. PATENT DOCUMENTS

| | | | |
|---|---|---|---|
| 3,027,786 | 4/1962 | Severson | 407/40 X |
| 4,334,446 | 6/1982 | Field | 407/40 X |
| 4,344,724 | 8/1982 | Kress et al. | 407/36 |
| 4,423,989 | 1/1984 | Kress et al. | 407/50 X |
| 4,566,828 | 1/1986 | Reinauer. | |
| 4,645,383 | 2/1987 | Lindsay | 407/36 |
| 5,064,316 | 11/1991 | Stojanovski | 407/48 X |

FOREIGN PATENT DOCUMENTS

| | | |
|---|---|---|
| 0117237A3 | 8/1984 | European Pat. Off.. |
| 0123887A2 | 11/1984 | European Pat. Off.. |
| 0216064A1 | 4/1987 | European Pat. Off.. |
| 2082102 | 3/1982 | United Kingdom. |

*Primary Examiner*—M. Rachuba
*Assistant Examiner*—Henry Tsai
*Attorney, Agent, or Firm*—Pennie & Edmonds

[57] ABSTRACT

A cutting tool for rotary machining operations comprising: a tool holder, a leading end thereof having a substantially rigid support jaw formed with an insert supporting seat having a jaw support surface and a pair of jaw abutment walls diverging from a jaw apex, and juxtaposed with respect to the support jaw, a resiliently displaceable clamping jaw having a jaw clamping surface juxtaposed with respect to the jaw support surface, the jaws defining between them an insert receiving slot and being formed with aligned screw receiving bores;

the cutting insert having a cutting portion and an integrally formed body portion adapted to be received in the slot, and having insert clamping and support surfaces, the jaw apex constituting a jaw abutment apex and being disposed adjacent a leading end of the support jaw, a recess being formed in the body portion, diverging outwardly from the cutting portion and having side walls formed with insert apical and side abutting portions such that when the insert is supported by the insert supporting seat of the support jaw it is located in a predetermined position by respective abutment of the jaw abutment apex and walls against the insert apical and side abutting portions.

6 Claims, 7 Drawing Sheets

CUTTING TOOL

FIELD OF THE INVENTION

The present invention relates to a cutting tool consisting of a tool holder and a replaceable cutting insert mounted therein to be used in rotary machining operations. The present invention is particularly concerned with tools such as for use in milling and drilling, in particular, end milling and drilling for profile machining of shaped surfaces, narrow slots, rounded grooves or corners, curved three-dimensional surfaces, etc. and to inserts for use in such tools.

BACKGROUND OF THE INVENTION

A cutting tool of the kind to which the present invention refers comprises a tool holder having an insert receiving slot and a cutting insert, e.g. of a ball-ended type, replaceably mounted therein. In view of the substantially circular shape of the cutting edge of such an insert in the tool the cutting force components acting on the cutting edge are of relatively great value and the tool has to be designed so as to ensure that position of the insert in the tool holder is effectively and accurately fixed and that the cutting insert itself is of sufficient strength.

Tools of such a kind are disclosed, for example, in E.P. 216064 and U.S. Pat. No. 4,566,828. Thus, a metal cutting tool disclosed in U.S. Pat. No. 4,566,828 consists of a tool holder having a pair of clamping jaws defining therebetween an insert receiving slot and a replaceable disk-like cutting insert mounted in the slot. The insert is secured in the holder by means of a clamping screw penetrating through screw bores formed respectively in the jaws and in a body of the insert. In order to replace the cutting insert the clamping screw has to be completely screwed out of the cutting tool, rendering such replacement operation time consuming. Furthermore, where the cutting insert is relatively small, as is the cutting tool, such manner of clamping has disadvantages connected with the necessity of forming in such small cutting insert a screw receiving bore, which, on the one hand, limits manufacturing possibilities for such inserts and, on the other hand weakens the insert.

It is the object of the present invention to provide an improved cutting tool, wherein a cutting insert is mounted in a tool holder in a new, effective manner enabling an easy and quick replacement of the insert in the tool, and an insert particularly suitable for such a tool especially for profile machining of shaped surfaces.

SUMMARY OF THE INVENTION

In accordance with the present invention there is provided a cutting tool for rotary machining operations comprising:

a tool holder, a leading end thereof having a substantially rigid support jaw formed with an insert supporting seat having a jaw support surface and a pair of jaw abutment walls diverging from a jaw apex, and juxtaposed with respect to said support jaw, a resiliently displaceable clamping jaw having a jaw clamping surface juxtaposed with respect to the jaw support surface, said jaws defining between them an insert receiving slot and being formed with aligned screw receiving bores;

a clamping screw adapted to be screw coupled in said bores so as to bias said clamping jaw towards said support jaw; and a cutting insert having a cutting portion and an integrally formed body portion adapted to be received in said slot, said insert body portion having an insert clamping surface and an insert support surface oppositely disposed with respect to said insert clamping surface, the arrangement being such that upon screw coupling of said screw in said bores so as to pass through the insert receiving slot said resilient jaw is displaced so as to clamp said insert body portion to said support jaw, characterised in that said a jaw abutment apex constitutes a jaw abutment apex and is disposed adjacent a leading end of said support jaw, and a recess is formed in said body portion, diverging outwardly from said cutting portion and having side walls formed with insert apical and side abutting portions such that when said insert is supported by said insert supporting seat of the support jaw it is located in a predetermined position by respective abutment of said jaw abutment apex and walls against the insert apical and side abutting portions.

There is also provided in accordance with the present invention a cutting insert for use with the above cutting tool having a cutting portion and an integrally formed body portion adapted to be mounted in an insert receiving slot formed in a tool holder;

said insert body portion having an insert clamping surface and an insert support surface oppositely disposed with respect to said insert clamping surface, a recess formed in said body portion, diverging outwardly from said cutting portion and having side walls formed with insert apical and side abutting portions.

Preferably, the jaw and the insert clamping surfaces slope downwardly towards the respective jaw and insert support surfaces in the direction of the leading end thereof so as upon the screw coupling of said screw in said bores to bias the insert inwardly against the insert receiving seat.

Preferably, the jaw clamping surface is of a concave shape and consists of mutually inclined clamping surface portions diverging in the direction away from the leading end of said support jaw and slanted with respect to the jaw support surface, the insert clamping surface being of a convex shape and comprising two insert clamping surface portions disposed in a manner corresponding to the jaw clamping surface portions.

Preferably, the recess is formed with a notch adjacent the insert support surface, a wall of the notch constituting said apical abutting portion, and the walls of said recess are substantially recessed with respect to the insert abutting portions ensuring thereby that a contact between the insert and the jaw abutting surfaces is at predetermined locations and that an area of such contact is decreased.

Thus, such construction of a cutting tool with a specific, horseshoe-like manner of mounting an insert in a tool holder, ensures that an accurate positioning of the cutting insert in the tool holder and an effective clamping of the insert in this position can be achieved easily and quickly and a replacement of the insert can be effected without the necessity of screwing a clamping screw completely out of the tool.

Furthermore, the present invention enables designing the cutting tool so as to ensure that locations of contact between an insert and an insert receiving slot are most suitable for a specific geometry of insert cutting edges.

Thus, a cutting insert according to the present invention may be of the kind in which at least a leading end of said insert body portion has a part disk shape and comprises a top surface, a bottom surface, the cutting portion being defined therebetween along a periphery of said leading end;

said cutting portion comprising a top and a bottom cutting edge disposed on two sides of a longitudinal axis of the insert, at least one of the cutting edges being of a substantially helical shape and being located on a segment of a spherical surface, each cutting edge being defined between a chip forming surface constituted by a respective portion of the top or bottom surface and a relief flank surface and extending from a cutting edge front extremity disposed at a front end of the cutting portion adjacent the longitudinal axis of the insert to a cutting edge trailing extremity disposed at a lateral end of the cutting portion of the insert.

Preferably, the top cutting edge front extremity is substantially closer to the longitudinal axis of the insert than the bottom cutting edge front extremity enabling thereby said top cutting edge to cut a workpiece in a central cutting area. In consequence with such asymmetric construction of the cutting portion of the insert, the jaw and the insert abutment and clamping surfaces are of an appropriate asymmetric design. Thus, a recess side wall adjacent the top cutting edge and a corresponding jaw abutment edge are designed to intersect the longitudinal axis of the tool so that an area of contact of the jaw abutment apex with the insert recess is located eccentrically with respect to the longitudinal axis.

Thus, the present invention enables clamping a cutting insert having specific cutting edge geometry in a tool holder of a cutting tool in a manner most advantageous for such geometry allowing to achieve maximal resistance of the tool and the insert against machining forces.

BRIEF DESCRIPTION OF THE DRAWINGS

For a better understanding of the present invention and to show how the same may be carried out in practice reference will now be made to the accompanying drawings, in which.

DETAILED DESCRIPTION OF PREFERRED EMBODIMENTS

Figure 1:
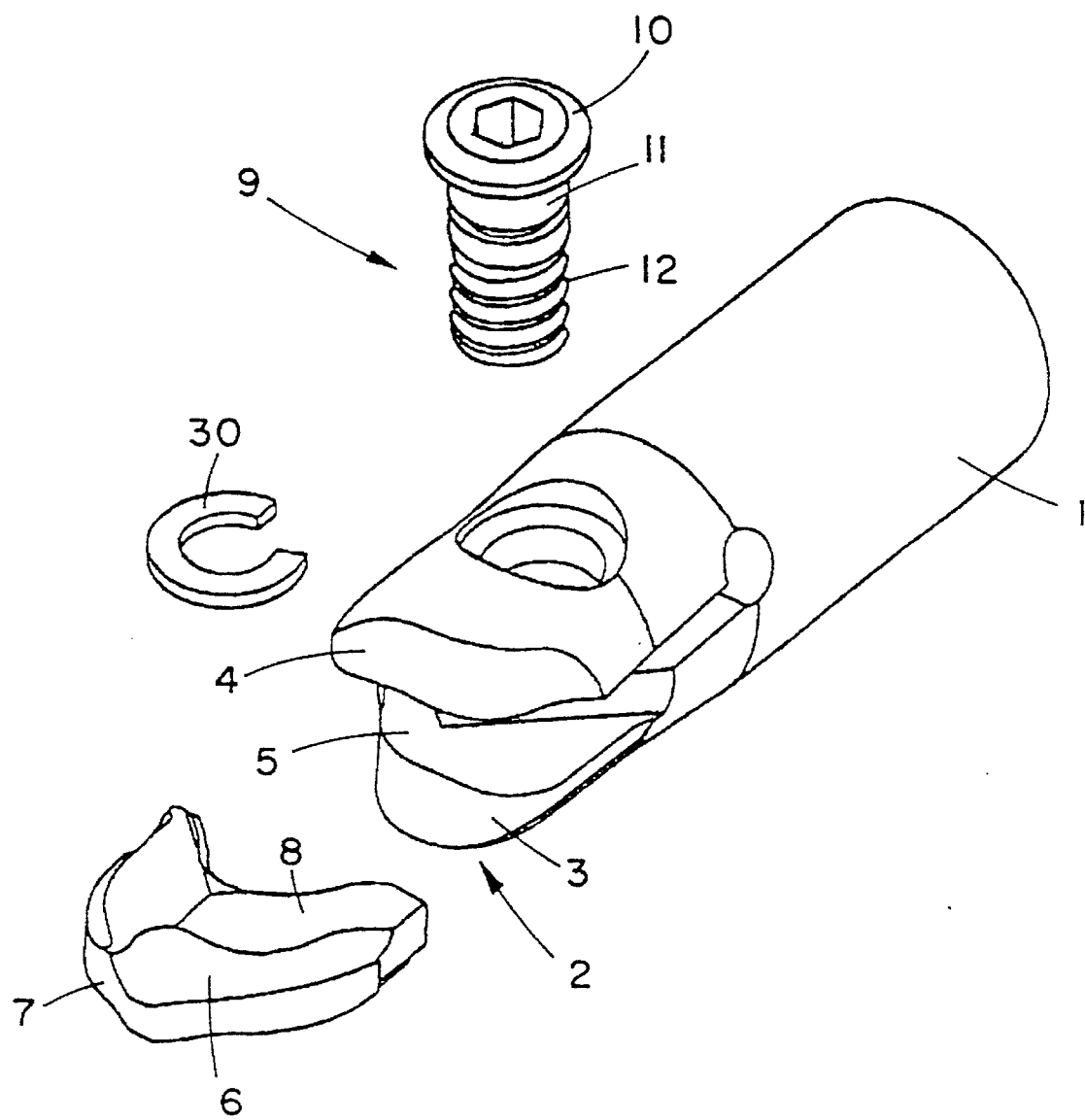
FIG. 1 is an exploded view of a cutting tool, according to the present invention.

The component elements of a rotary ball-nose end mill tool, in accordance with the present invention, is shown in FIG. 1. The tool comprises a tool holder 1 having a leading end 2 formed with a substantially rigid support jaw 3 and, juxtaposed with respect thereto a resiliently displaceable clamping jaw 4, the jaws 3 and 4 defining between them an insert receiving slot 5. A replaceable cutting insert 6 has a cutting portion 7 and an integrally formed body portion 8 adapted to be received in the slot 5 and clamped therein by clamping screw 9 having a head portion 10 and a cylindrical portion 11 with a screw thread portion 12 at the end thereof remote from the head portion 10.

As seen in FIGS. 2, 3, 4, 5 and 6 illustrating the leading end 2 of the tool holder 1, the support jaw 3 is formed with an insert supporting seat 3' having a jaw support surface 13 and a pair of jaw abutment walls 15, 16 (FIG. 3) diverging from a jaw abutment apex 17 adjacent a leading end 18 of the support jaw 13 and forming thereby a prismatic shoulder for positioning the insert in radial direction. The jaw abutment wall 15 is longer than the jaw abutment wall 16 and intersects a longitudinal axis A of the tool. The clamping jaw 4 has a jaw clamping surface 14 juxtaposed with respect to the jaw support surface 13. The jaw clamping surface 14 is of a prismatic, concave shape (FIGS. 4, 5, 6) and consists of mutually inclined clamping surface portions 20 and 21 merging along a line 14', diverging in the direction away from the leading end 18 of the support jaw and slanted with respect to the jaw support surface 13 at angles $\beta$, seen in cross-sections of the tool holder along the lines V—V and VI—VI normal to the jaw abutment walls 15 and 16. In consequence of such disposition of the clamping surface portions 20 and 21 their front portions adjacent the line 14' define angles $\alpha$ with the support surface 13 (FIG. 4) and slightly slope at angle $\gamma$ (FIG. 2) towards the jaw support surface 13 in the direction of the leading end 18 of the support jaw, thereby enabling the insert receiving slot 5 to function as a double clamping wedge.

The jaws 3 and 4 are formed with aligned screw bores 23 and 24 for receiving therein the clamping screw 9. The screw bore 23 is formed in the support jaw 3 and is internally threaded being adapted to cooperate with the screw thread portion 12. The screw bore 24 is formed in the clamping jaw 4 and is countersunk with an outwardly tapering portion 26 having a maximal diameter greater than a maximal cross-sectional dimension of the screw head 10 and a cylindrical portion 27 adapted to freely receive the screw cylindrical portion 11. The tapering portion 26 has a bore clamping raised portion 28 which is innermost with respect to a clamping jaw leading end. The screw bores 23 and 24 are slightly inclined towards the leading end 2 of the tool holder.

Figure 2:
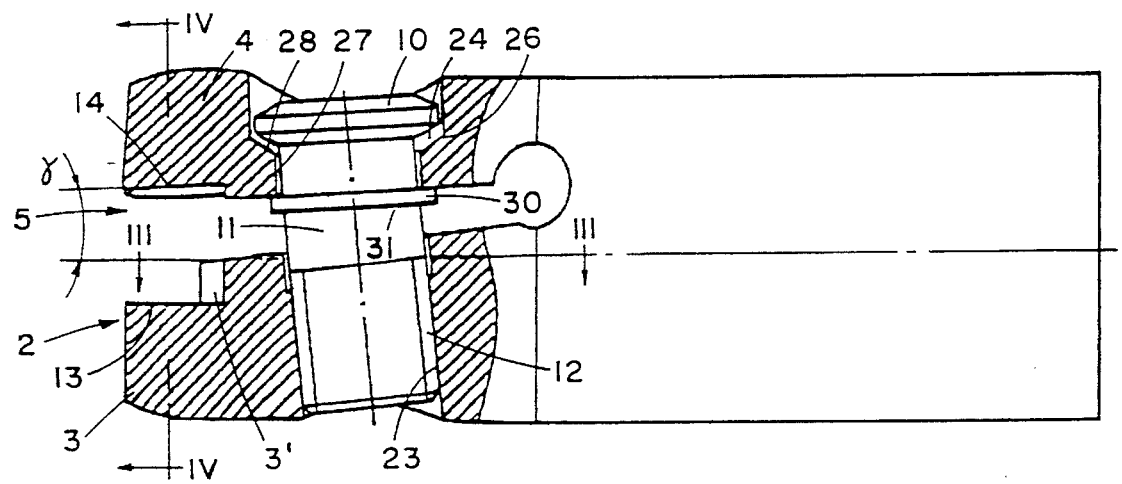
FIG. 2 is a longitudinal cross-sectional view of a tool holder shown in FIG. 1.
Figure 3:
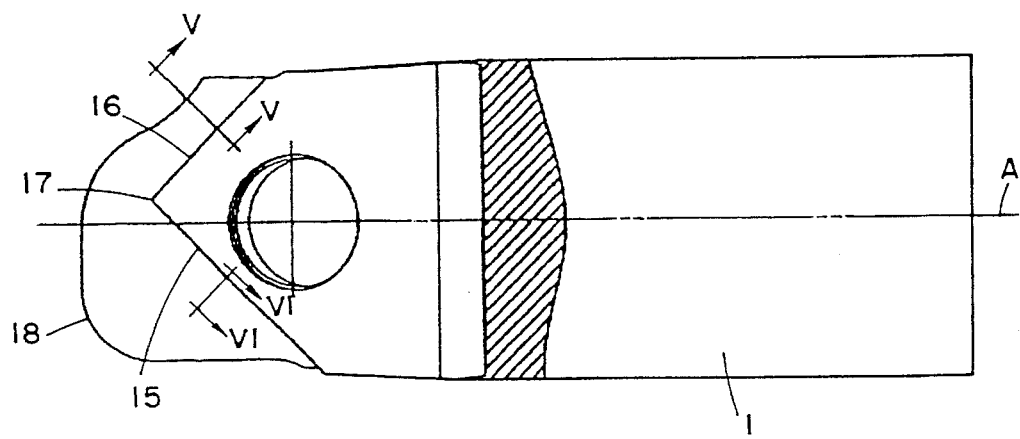
FIG. 3 is a cross-sectional view along the line III—III of the tool holder shown in FIG. 2.
Figure 6:
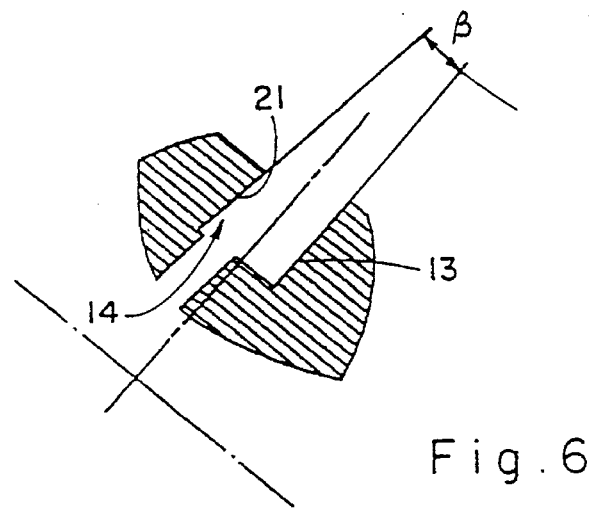
FIG. 6 is a cross-sectional view along the line VI—VI of the tool holder shown in FIG. 3.
Figure 5:
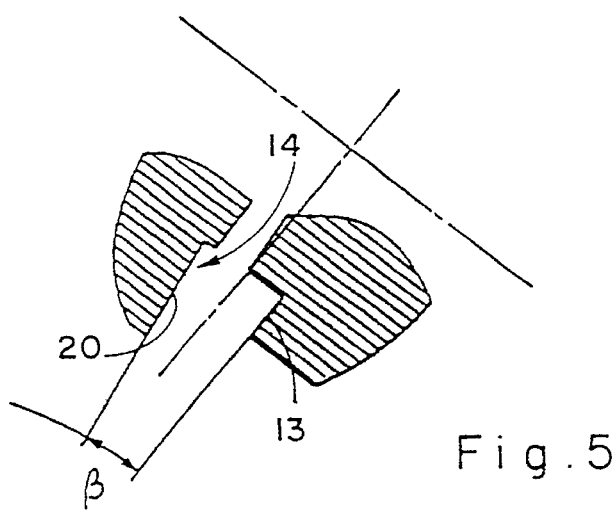
FIG. 5 is a cross-sectional view along the line V—V of the tool holder shown in FIG. 3.
Figure 4:
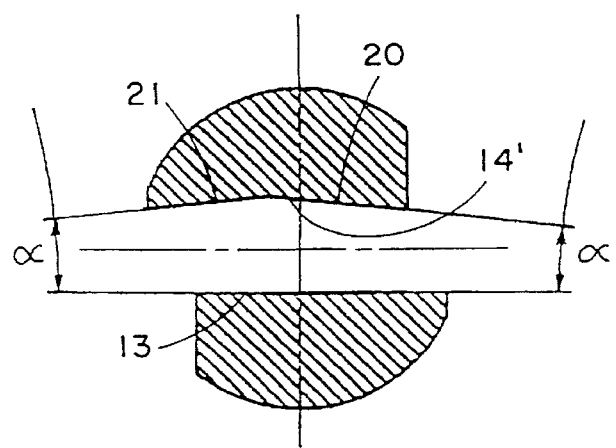
FIG. 4 is a cross-sectional view along the line IV—IV of the tool holder shown in FIG. 2.
Figure 7:
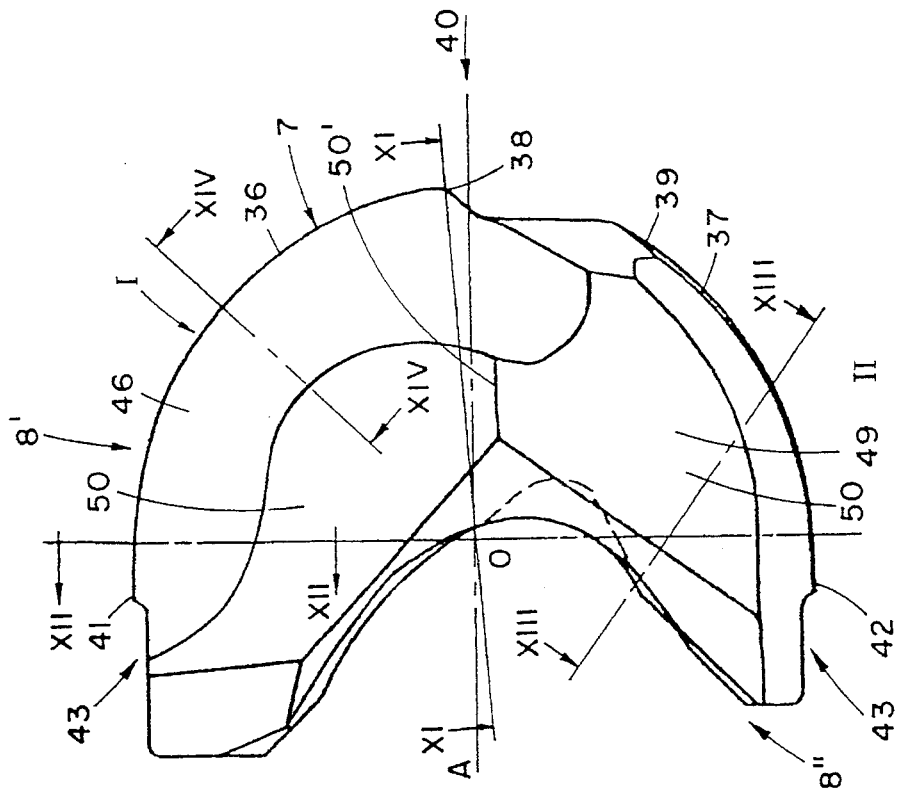
FIG. 7 is a top view of an insert, according to the present invention, shown in FIG. 1.
Figure 8:
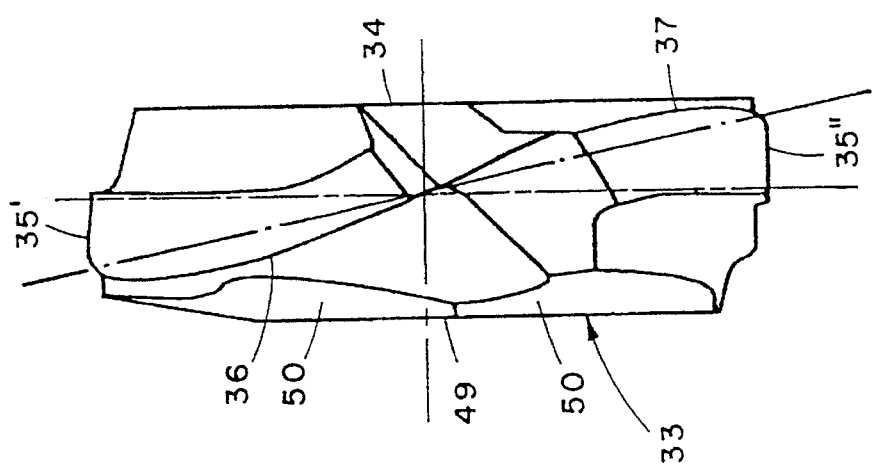
FIG. 8 is a front view of the insert shown in FIG. 1.

As seen in FIGS. 1 and 2, the clamping screw 9 is provided with a snap ring 30 adapted to be received in a groove 31 formed in the screw cylindrical portion 11 so that a distance between the screw head 10 and the snap ring 30 is greater than a height of the cylindrical portion 27 of the screw bore 24.

The cutting insert 6 has a prismatic shape and is shown in FIGS. 7, 8, 9 and 10. A leading end 8' of the insert body portion 8 has a part disc shape and a terminal end 8" of the insert body portion 8 is of a horseshoe-like shape. The insert body portion 8 has a top surface 33 and a bottom surface 34, the insert cutting portion 7 being located along a periphery of the insert 6.

The insert cutting portion 7 is designed so as to provide for cutting along cutting edges 36 and 37 of a substantially helical shape and located on a true spherical surface allowing thereby for machining of a workpiece surface in accordance with computer instructions. The spherical surface segments are schematically designated by I and II (FIG. 7) and are disposed on two sides of the longitudinal axis A of the insert, the spherical surface having its center O on the longitudinal axis A. The cutting edges 36 and 37 are located adjacent either top 33 or bottom 34 surface of the insert body 8 thus constituting top and bottom cutting edges 36 and 37 and are defined between respective chip forming rake surfaces 46 and 47 and relief flank surfaces 35' and 35". Each cutting edge 36, 37 extends from a cutting edge front extremity 38, 39 disposed at a front end 40 of the cutting portion 7 adjacent the longitudinal axis A to a cutting edge trailing extremity 41, 42 disposed at a lateral end 43 of the cutting portion 7. In the described preferred embodiment the top cutting edge front extremity 38 is substantially closer to the longitudinal axis A of the insert than the bottom cutting edge front extremity 39 and has a configuration enabling the top cutting edge 36 to cut a workpiece in a central cutting area. Portions of the top 33 and bottom 34 surfaces adjacent respectively the top and bottom cutting edges 36 and 37 constitute the chip forming rake surfaces 46 and 47 (FIGS. 7, 10) of the cutting portion 7 of the insert.

Figure 11:
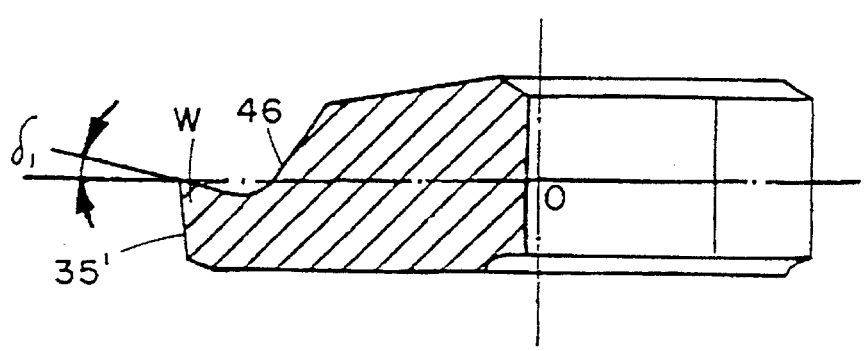
FIG. 11 is a cross-sectional view along the line XI—XI of the insert shown in FIG. 7.
Figure 12:
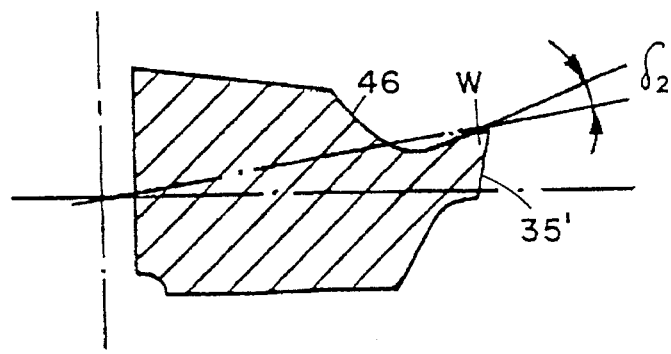
FIG. 12 is a cross-sectional view along the line XII—XII of the insert shown in FIG. 7.

A rake angle $\delta$ is preferably positive and varies along the cutting edge 36 from its small value $\delta_1$ at the front end 40 of the cutting portion 7 to a greater value $\delta_2$ at the lateral end 43 of the cutting portion 7 (FIGS. 11 and 12). The relief flank surfaces 35' and 35" adjacent the cutting edges 36 and 37 are formed so as to provide a constant relief from an internal spherical surface of a workpiece during rotation of the tool. Thus, a three dimensional cutting geometry is provided around the cutting edges enabling to improve chip formation in a broad range of cutting speeds and to strengthen a cutting wedge W adjacent the cutting edges, which is particularly important for a central cutting area working under conditions of zero speed and high friction forces.

Figure 9:
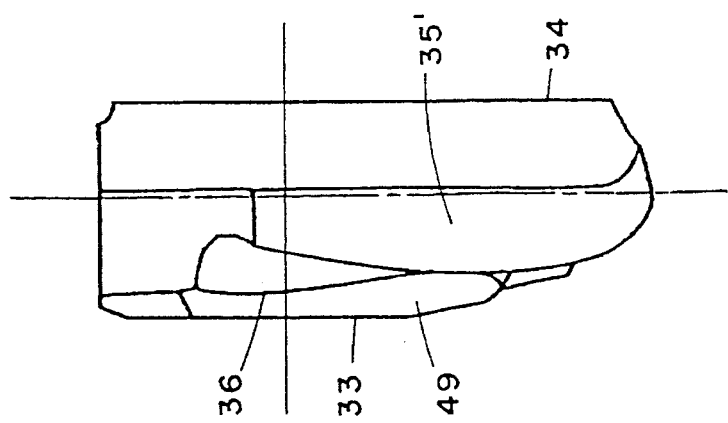
FIG. 9 is a side view of the insert shown in FIG. 1.
Figure 13:
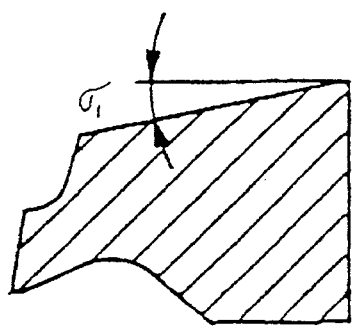
FIG. 13 is a cross-sectional view along the line XIII—XIII of the insert shown in FIG. 7.
Figure 14:
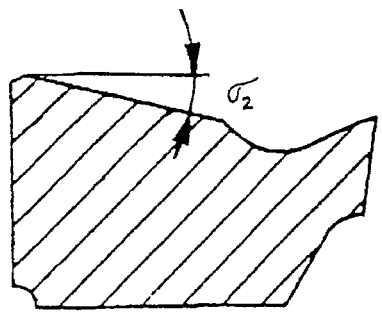
FIG. 14 is a cross-sectional view along the line XIV—XIV of the insert shown in FIG. 7.

The insert body portions 8 to be positioned in the insert supporting seat 3' of the support jaw 3 and clamped thereto by the clamping jaw 4 has an insert support surface 51 (FIG. 10) formed in the insert bottom surface 34 and adapted to be supported by the jaw support surface 13 and an insert clamping surface 49 formed in the insert top surface 33 and being of a convex shape corresponding to the concave shape of the jaw clamping surface 14. Thus, the insert clamping surface 49 consists of two mutually inclined insert clamping portions 50 merging along a line 50', diverging in the direction away from the front end 40 of the cutting portion and slanted with respect to the insert support surface at angles $\sigma_1$ and $\sigma_2$ (FIGS. 13 and 14) which are equal or slightly less than the corresponding angles $\beta$ of the jaw support surface 13. As seen in FIG. 9, the insert clamping portions 50 slope downwardly towards the insert support surface 51 in the direction of the front end 40 of the cutting portion 7 in a manner corresponding to that of the jaw clamping surface portions 20 and 21.

Figure 10:
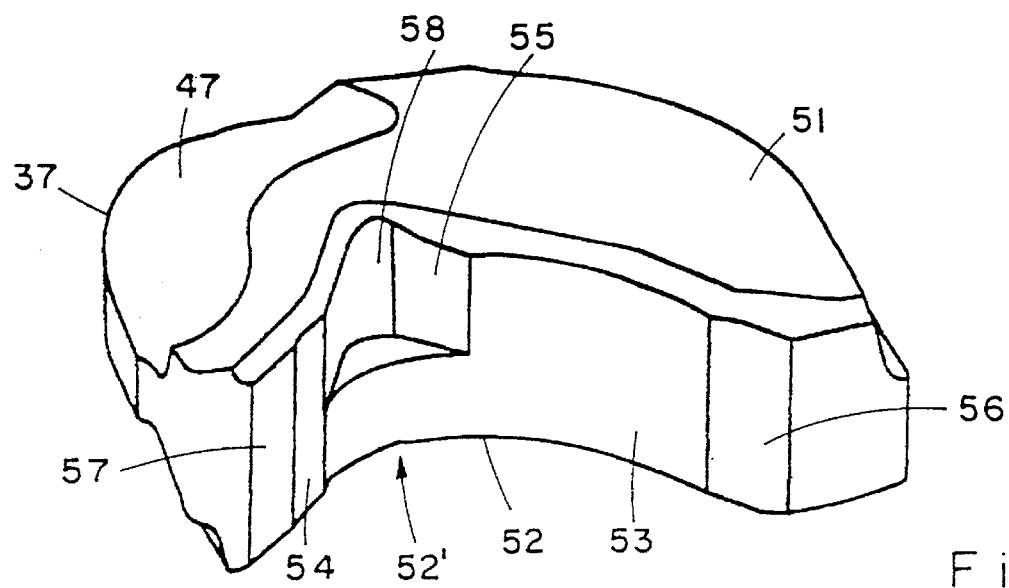
FIG. 10 is a perspective view from the bottom of the insert shown in FIG. 1.
Figure 17:
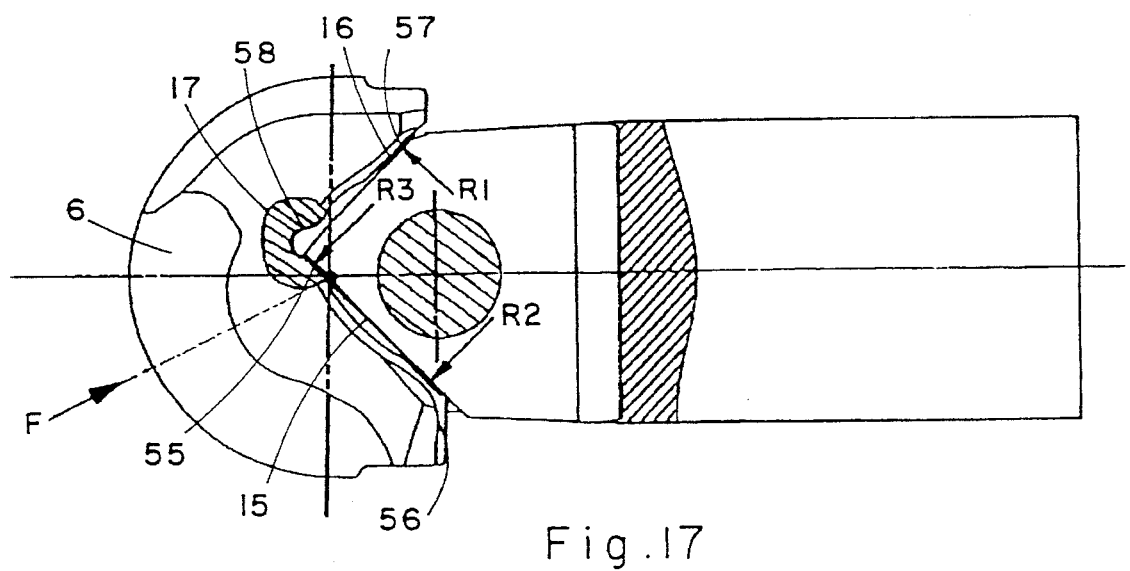
FIG. 17 is a cross-sectional view along the line XVII—XVII of the cutting tool shown in FIG. 16.

The insert body portion 8, seen better in FIGS. 10 and 17, is formed with a concave recess 52 diverging outwardly from a recess apex 52' disposed adjacent the front end 40 of the insert cutting portion 7 and having an insert apical abutting portion 55 and side walls 53 and 54 recessed with respect to projecting side abutting portions 56 and 57. The recess 52 is formed with a notch 58 having a stepped configuration and formed adjacent the insert support surface 51 so that its wall constitutes the insert apical abutting portion 55. In consequence of the above-described asymmetric construction of the cutting portion 7 of the insert, the insert recess 52 and, in particular, its abutting portions are of an appropriate asymmetric design with respect to the axis A and the insert apical abutting portion 55 is located eccentrically with respect to the center O of the spherical surface.

The clamping screw 9 is inserted into the screw bores 24 and 23 of the clamping and support jaws 4, 3 of the tool holder 1 (FIG. 2) so that the screw thread portion 12 engages the internally threaded screw bore 23, the snap ring 30 is placed in the groove 31 of the clamping screw cylindrical portion 11.

Figure 15:
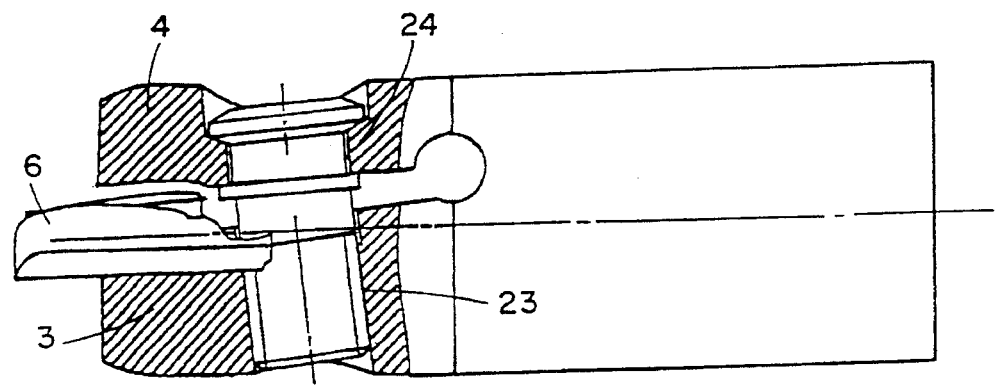
FIGS. 15 and 16 illustrate a manner of assembling the cutting tool shown in FIG. 1.

When the insert 6 is received in the slot 5 being positioned in the insert supporting seat 3' (FIG. 15, 16, 17), the jaw abutment apex 17 and walls 15 and 16 of the support jaw 3 abut against the insert apical abutting portion 55 and side abutting portions 56, 57 ensuring thereby an accurate and repeatable positioning of the cutting insert 6 in the tool holder 1. Due to the outwardly sloping shape of the recess walls 53 and 54 and the stepped recess notch 58, the insert and the support jaw contact each other at predetermined locations ensuring thereby a firm positioning of the insert with respect to components $R_1$, $R_2$ and $R_3$ of machining force F. The eccentric position of contact between the insert apical abutting portion 55 and the jaw abutment apex 17 which is designed in consequence of the asymmetric shape of the cutting portion 7 improves the insert stability during machining.

Figure 16:
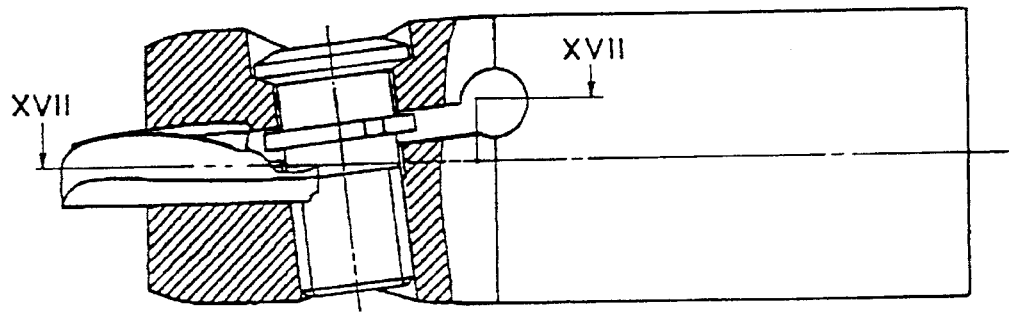

Upon the complete insertion of the screw thread portion 12 in the threaded screw bore 23 and consequent bearing of the clamping screw head 10 against the clamping raised portion 28 of the countersunk screw bore 24, the resilient clamping jaw 4 is displaced so as to clamp the insert body portion 8 to support jaw 3 (FIG. 16). Due to the wedge configuration of the insert clamping surface 49 and the jaw clamping surface 14 the latter biases the insert into abutment against the insert supporting seat so that an effective clamping of the insert in its position is thereby achieved.

When the insert 1 is to be replaced, the clamping screw 9 is released and slightly screwed outwardly so as to cause the snap ring 30 to bias the clamping jaw 4 away from the insert clamping surface 50 thereby widening the insert receiving slot 5 rendering it ready for removing and replacing the insert. Thus, an easy and quick replacement of the insert can be effected without the necessity of removing the clamping screw out of the cutting tool.

It should be noted that the cutting tool according to the present invention may be used with inserts of different types and can have features different from those shown in the above described drawings. Thus, the clamping jaw may be formed as a separate part rather than being formed integrally with the tool holder. The jaw and the insert support surfaces may be curved, e.g. concave or convex. The jaw clamping surface may have a convex configuration with the insert clamping surface being consequently concave. The areas of contact of the insert recess with the jaw abutment surfaces may be at locations different from those described above, e.g. disposed symmetrically with respect to a longitudinal axis of the tool, depending on a specific configuration of the insert cutting portion.

We claim:

1. A cutting tool for rotary machining operations comprising in combination:

a tool holder having a leading end, said holder comprising
a substantially rigid support jaw,
a resiliently displaceable clamping jaw juxtaposed with respect to said support jaw,
a first bore in said support jaw aligned with a second bore in said clamping jaw, said bores adapted to receive a clamping screw for screw clamping an insert between said support jaw and said clamping jaw,
an insert receiving slot defined between said support jaw and said clamping jaw, and
an insert supporting seat formed on said support jaw, said seat comprising a jaw abutment apex disposed substantially adjacent said leading end, a first and a second jaw abutment wall diverging from said apex in a direction away from said leading end, and a jaw support surface, said jaw support surface being juxtaposed with respect to a jaw clamping surface of said clamping jaw; and
a cutting insert having a cutting portion, and an integrally formed body portion adapted to be received into said slot, said body portion comprising
an insert support surface,
an insert clamping surface, and
a recess having an insert apical abutment and recess side walls, said recess side walls diverging outwardly away from said cutting portion and having formed thereon a pair of insert side abutments, said insert apical abutment and said insert side abutments abutting said jaw abutment apex and said jaw abutment walls, respectively;

wherein
said first and second bores are disposed, at least partly, between said recess side walls and between said jaw abutment walls.

2. A cutting tool according to claim 1 wherein the insert clamping surface and the jaw clamping surface slope downward in the direction of the leading end so as to bias the insert against the insert supporting seat upon screw clamping.

3. A cutting tool according to claim 1 wherein
the jaw clamping surface has a concave shape formed by mutually inclined jaw clamping surface portions which are slanted with respect to the jaw support surface, and
the insert clamping surface has a convex shape formed by two mutually inclined insert clamping surface portions, also slanted with respect to the jaw support surface.

4. A cutting tool according to claim 1 wherein
said recess is formed with a notch adjacent the insert support surface,
walls of said notch form said insert apical abutment, and
said recess walls are substantially recessed with respect to said insert side abutments.

5. A cutting insert for use with a cutting tool, said insert comprising:
a cutting portion; and
an integrally formed body portion adapted to be inserted into a tool holder slot, said body portion comprising
an insert support surface,
an insert clamping surface, and
a recess having an insert apical abutment disposed substantially adjacent a leading end of the insert and recess side walls diverging outwardly away from said cutting portion, said recess side walls forming a pair of insert side abutments.

6. A cutting insert according to claim 5 wherein at least said leading end of the insert has a part disk shape, said part disk shape having a top and a bottom surface;
said cutting portion is located along a periphery of said part disk-shaped leading end, between said top and bottom surfaces;
said cutting portion comprises a top and a bottom cutting edge disposed on either side of a longitudinal axis of the insert, at least one of said cutting edges having a substantially helical shape and being located on a segment of a spherical surface;
each cutting edge is defined between a chip forming surface and a relief flank surface, said chip forming surface being a portion of a respective one of said top and bottom surfaces; and
each cutting edge extends from a cutting edge front extremity disposed at a front end of said cutting portion adjacent a longitudinal axis of the insert to a cutting edge trailing extremity disposed at a lateral end of said cutting portion of the insert.

* * * * *